United States Patent [19]

Kokaram

[11] Patent Number: 5,500,685
[45] Date of Patent: Mar. 19, 1996

[54] WIENER FILTER FOR FILTERING NOISE FROM A VIDEO SIGNAL

[75] Inventor: Anil C. Kokaram, Cambridge, United Kingdom

[73] Assignee: AVT Communications Limited, London, United Kingdom

[21] Appl. No.: 323,507

[22] Filed: Oct. 14, 1994

[30] Foreign Application Priority Data

Oct. 15, 1993 [GB] United Kingdom .................... 9321372

[51] Int. Cl.$^6$ ..................................................... H04N 5/213
[52] U.S. Cl. ........................... 348/620; 348/407; 348/699; 382/275
[58] Field of Search .................................... 348/607, 615, 348/619, 620, 700, 699, 407; 382/107, 236, 260, 261, 275, 280; H04N 5/213, 5/21

[56] References Cited

U.S. PATENT DOCUMENTS

| | | | |
|---|---|---|---|
| 5,121,445 | 6/1992 | Tsujiuchi et al. | 382/62 |
| 5,237,413 | 8/1993 | Israelsen et al. | 348/700 |
| 5,245,677 | 9/1993 | Lepore et al. | 382/52 |
| 5,398,079 | 3/1995 | Liu et al. | 348/699 |
| 5,414,782 | 5/1995 | Carasso | 382/270 |

FOREIGN PATENT DOCUMENTS

| | | | |
|---|---|---|---|
| 0114961 | 8/1984 | European Pat. Off. | G06F 15/68 |
| 0525408 | 2/1993 | European Pat. Off. | H04N 5/21 |
| 2188510 | 9/1987 | United Kingdom | H04N 7/13 |

OTHER PUBLICATIONS

J. Boyce, Noise Reduction of Image Sequences Using Adaptive Motion Compensated Frame Averaging, *IEEE ICASSP*, vol. 3, pp. 461–464, 1992.
A. K. Jain, "Fundamentals of Digital Image Processing", Prentice–Hall International, Inc., pp. 275–291, 1989.
J. S. Lim, "Two Dimensional Signal and Image Processing", Prentice– Hall, pp. 524–536, 1990.
M. Bierling, "Displacement Estimation by Hierarchial Blockmatching", *SPIE VCIP*, pp. 942–951, 1988.
W. Enkelmann, "Investigations of Multigrid Algorithms for the Estimation of Optical Flow Fields in Image Sequences", *Computer Vision Graphics and Image Processing*, vol. 43, pp. 150–177, 1988.
M. Ghanbari, "The Cross–Search Algorithm for Motion Estimation", *IEEE Transactions on Communications*, vol. 38, pp. 950–953, Jul. 1990.
M. K. Ozkan et al., "Efficient Multiframe Wiener Restoration of Blurred and Noisy Image Sequences", *IEEE Transactions on Image Processing*, vol. 1, No. 4, pp. 453–476, Oct. 1992.
R. W. Young et al., "Video Compression Using Lapped Transforms for Motion Estimation/Compensation and Coding", *SPIE vol. 1818 Visual Communications and Image Processing*, pp. 276–288, 1992.
A. Zaccarin et al., "Fast Algorithms for Block Motion Estimation", *ieee icassp*, vol. 3, pp. 449–452, 1992.
European Search Report for Application No. 94307486.4 dated Jun. 1, 1995.

*Primary Examiner*—James J. Groody
*Assistant Examiner*—Jeffrey S. Murrell
*Attorney, Agent, or Firm*—Schwegman, Lundberg & Woessner

[57] ABSTRACT

A digital Wiener filtering method is proposed which applies motion compensation by successive approximations of increasing resolution to determine displacement vectors for two successive image frames, a vectors defining a real displacement only being applied to a block of one of the frames when the mean absolute error associated with that vector is not greater than a given fraction of the mean absolute error between that block and the corresponding block of the other frame. The current frame is then filtered block-by-block, with the blocks overlapping. In this filtering, each block is a 3D volume of pixels from the current frame and blocks selected from the preceding and succeeding frames so as to correspond according to the displacement vectors. In one embodiment, the filtering comprises applying a 3D FFT to convert to a power spectrum in the frequency domain, followed by attenuation according to a Wiener filter and conversion from the frequency domain by the inverse FFT.

27 Claims, 5 Drawing Sheets

WIENER FILTER FOR FILTERING NOISE FROM A VIDEO SIGNAL

BACKGROUND OF THE INVENTION

This invention relates to video signal processing and is concerned with removing noise from a sequence of images such as a sequence of frames comprising a motion picture.

Many papers discussing noise reduction have been presented during the last two decades or so. Many motion compensated noise reduction methods have also been proposed. The types of noise that we are particularly concerned with are noise such as white Gaussian noise, noise which is equivalent to what one would see on a television if the channel were not tuned properly, and noise such as the graininess one sees when watching an old movie (strictly speaking this graininess is due in part to film grain noise which is not necessarily Gaussian distributed).

Suppose one has a set of images (called herein frames) of an image sequence corrupted by additive Gaussian noise. If the value of a pixel at coordinate (i,j) in frame n of the clean image sequence is I(i,j,n), then the value in the corrupted image g(i,j,n) is $$g(i,j,n) = I(i,j,n) + \eta(i,j,n) \qquad (1)$$

where $\eta(i,j,n)$ is additive white Gaussian noise. By Gaussian distributed noise, one means that if one had a frame containing only noise, and then made a histogram of the pixel values, the histogram would have a Gaussian shape. By white noise one means that the noise value at a particular pixel is uncorrelated with the values at any other pixel in any other frame or in any other part of the same frame. This latter constraint is perhaps the more important one for the following methods to function optimally.

One simple way to reduce the noise in the frames is just to average the frames as they arrive. Therefore a recursive averager can be used as set out below in equation (2), where, $\hat{I}_n(i,j)$ represents the value of the output pixel which is supposed to be an estimate of the clean image. $\hat{I}_{n-1}(i,j)$ is the previous output image pixel and $g_n(i,j)$ the current noisy image pixel. Therefore the output frame at time k is the average of all the previous k frames. If the frame contains a stationary scene, this would be fine, since the noise would be averaged out. However this is not normally the case and moving objects are blurred by this operation.

A motion compensated averager, such as is disclosed in the article by J. Boyce, 'Noise Reduction of Image Sequences Using Adaptive Motion Compensated Frame Averaging' in IEEE ICASSP, Volume 3, pages 461–464, 1992, works much better, as expected. The averaging operation is then directed along motion trajectories and so does not blur motion. However this operation is a purely temporal one and so is sensitive to errors in motion estimation. Furthermore, greater noise attenuation can be obtained by using the spatial information in each frame. An article entitled 'Motion-Adaptive Weighted Averaging for Temporal Filtering of Noisy Image Sequences', by M. Ozkan et al, SPIE Image Processing Algorithms and Techniques III, pages 201–212, February 1992, and that entitled 'Motion Compensated Enhancement of Noisy Image Sequences', IEEE ICASSP, vol.1, pages 2121–2124, 1990, are two papers which introduce spatio-temporal noise reduction tactics that achieve better results than the motion compensated frame averager.

An alternative noise reduction method is disclosed by Ozkan et al in their article entitled 'Efficient Multiframe Wiener Restoration of Blurred and Noisy Image Sequences', IEEE Transactions on Image Processing, Vol. 1, No. 4, pages 453–476, Oct. 1992. This method obtains the Fourier transform of each frame of the sequence to be restored to obtain a sequence of 2D Fourier frequency frames which are processed to reduce noise.

SUMMARY OF THE INVENTION

According to a first aspect of the present invention there is provided a method of removing noise from a current frame f of an image sequence having a plurality of frames, the method comprising applying a 3-dimensional Wiener filtering operation involving 3-dimensional correlations to a data set corresponding to or being produced from the values of a plurality of pixels in the current frame f and the values of a corresponding plurality of pixels in a succeeding frame f+1 and/or a preceding frame f−1 of the image sequence, whereby the values resulting from the filtering operation are each a function of said data set.

By 'frames' we mean to include individual images of a sequence, which may be, for example, frames of a cinematographic film or frames or fields of a television picture.

Said data set may correspond on a one to one basis with the values of pixels in the current frame and the values of pixels in a succeeding and/or preceding frame in which case the filtering operation may be of the finite impulse response (FIR) type involving 3D correlations of the pixel values in its processing.

Preferably however, the filtering operation is carried out in the frequency domain and may be, or may approximate, an infinite impulse response (IIR) filtering operation, said data set being obtained by Fourier transforming said values of pixels in the current frame and said values of pixels in the succeeding and/or preceding frame. Taking the power spectrum of 3D FFT operations implies 3D autocorrelations.

Thus according to a second aspect of the invention there is provided a method of filtering noise from a video image sequence, wherein the images are subject to a Wiener filtering operation in a 3D Fourier transform domain.

In one embodiment implemented as a digital filter, the space/time image sequence is transformed into the 3D frequency domain and the various frequency components are then attenuated by the filter to produce a modified 3D Fourier frequency expression of the signal which represents a noise reduced film sequence. A further step involves the inverse 3D Fourier transform which transforms the 3D Fourier transform expression into the space/time restored image sequence.

The filtering operation in this case may be applied so as to attenuate the power spectral density of frequency components within the data set with the level of attenuation being a function of the power spectral density itself. Frequency components having a spectral power density below a threshold level $\beta P_{\eta\eta}$, where $\beta$ is a constant greater than 1 and $P_{\eta\eta}$ is the power spectral density of a noise signal associated with each frequency component, may be attenuated by a a non-negative factor which reduces as $P_{gg}$ reduces, e.g. a factor which is a function of $\beta$.

Thus, according to a third aspect of the invention there is provided a method of removing noise from a current frame f of an image sequence having a plurality of frames, the method comprising applying a Wiener filtering operation to a data set, obtained by Fourier transforming the values of a plurality of pixels in the current frame f, to attenuate frequency components within the data set having a spectral power density below a threshold level $\beta P_{nn}$, where $\beta$ is a constant greater than 1 and $P_{nn}$ is the power spectral density of a noise signal associated with each frequency component, by a factor which is a function of $\beta$ and/or a non-negative factor which reduces as $P_{gg}$ reduces.

Other aspects of the invention concern digital filters for implementing such methods. For example, a digital filter for removing noise from a current frame f of an image sequence having a plurality of frames, the filter may comprise:

(a) means for applying a motion compensation process to at least one of a preceding and a succeeding frame;

(b) means for selecting a zone in said current frame;

(c) means for selecting, using motion compensation data from said applying means, substantially the same zone of the at least one of the said preceding and succeeding frames to define a three-dimensional data set of pixels;

(d) means for converting the data set to the frequency domain by applying a 3D FFT process to the said data set to produce a plurality of frequency components (bins) thereof;

(e) means for applying a Wiener filtering operation to attenuate the said frequency components (bins); and (f) means for applying the inverse of the said 3D FFT process to produce restored pixels of the said current frame f.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

Figure 1:
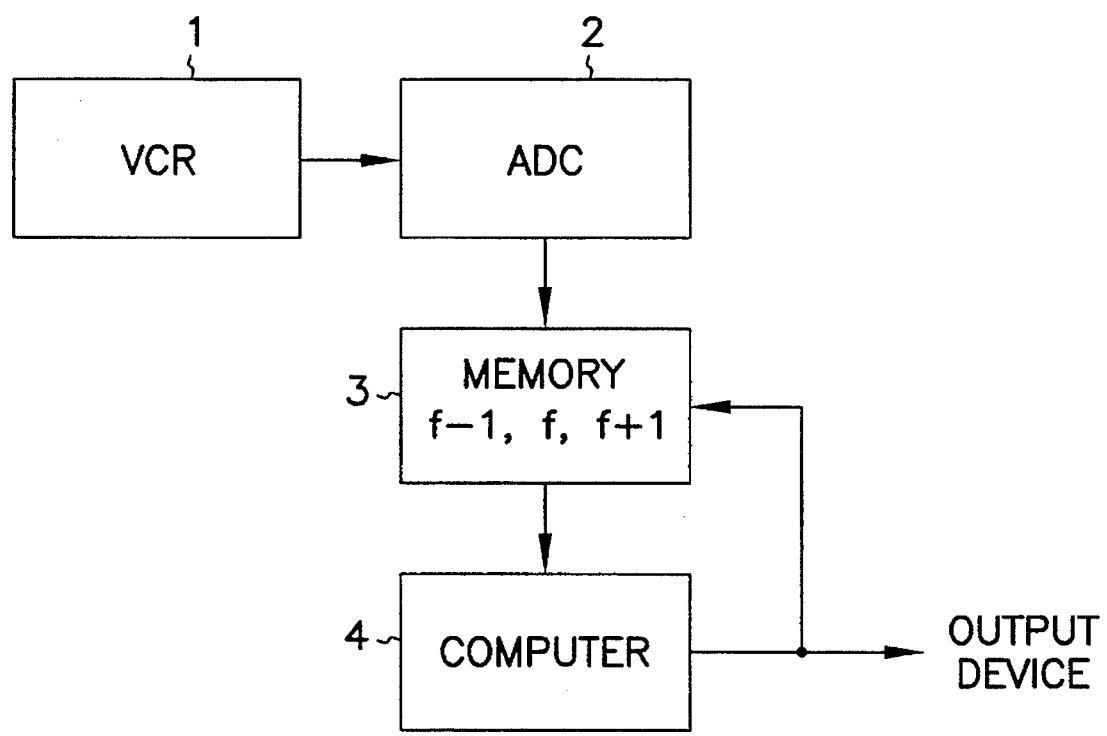
FIG. 1 is a block diagram of a system for removing noise from an image sequence.
Figure 4:
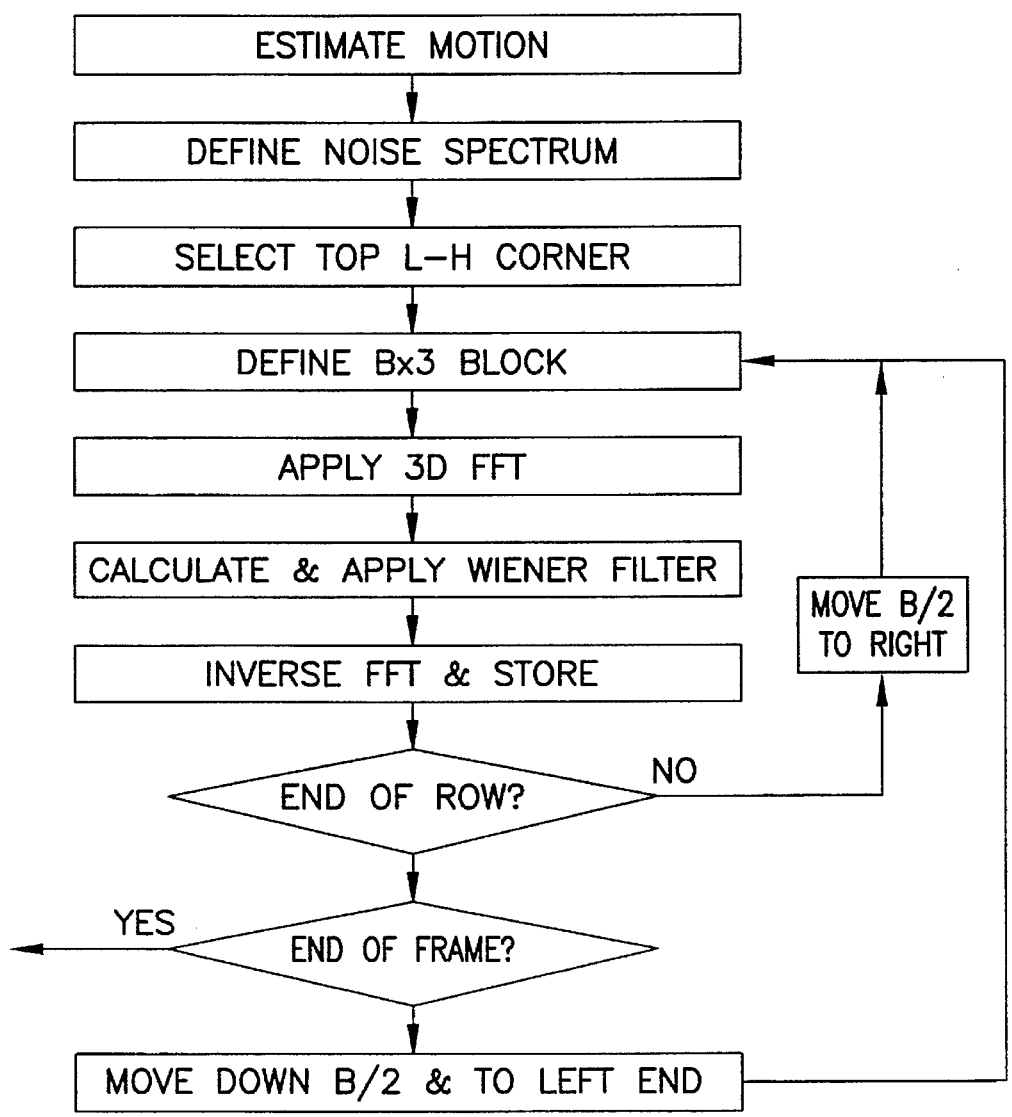
FIG. 4 is a block diagram of a digital video filter.
Figure 5:
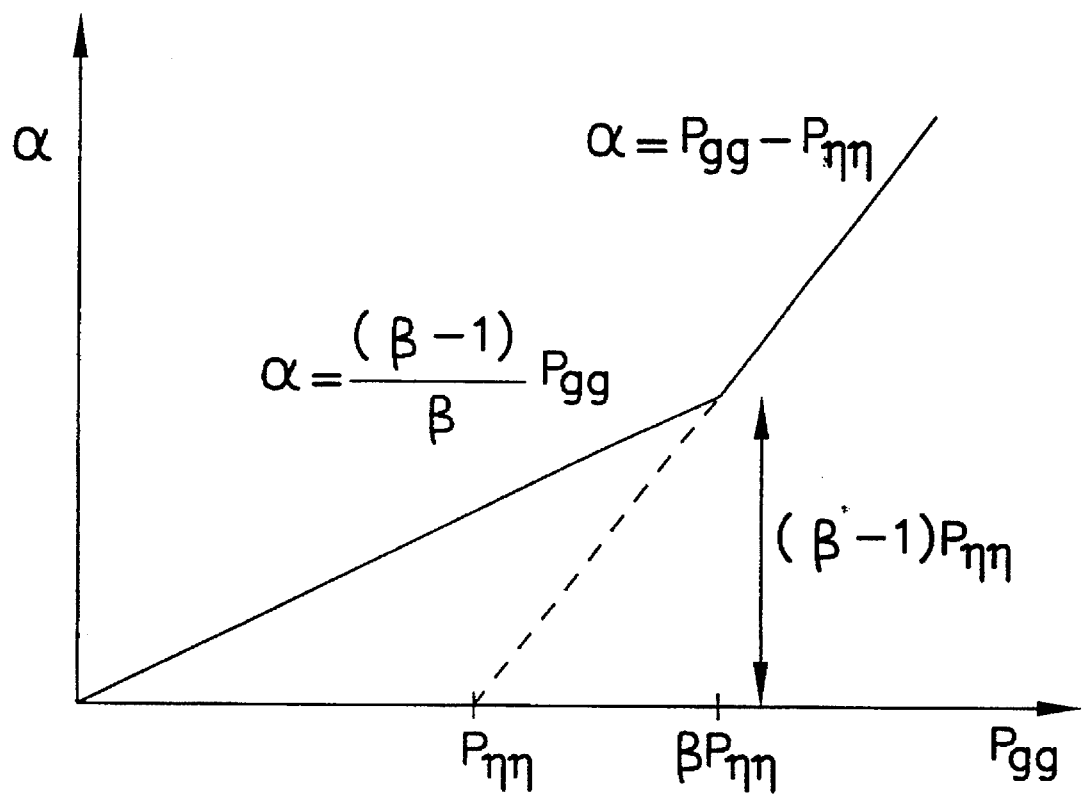
FIG. 5 is a graph illustrating the properties of a Wiener filter of the digital filter of FIG. 4.

FIG. 1 is a block diagram of a system suitable for carrying out an embodiment of the invention in the form of a digital filter as represented generally by FIG. 4. The system comprises an analogue to digital converter 2 for digitising an analogue input signal representing an image sequence comprising a plurality of frames, supplied by a VCR 1, a memory 3 for storing pixel location and intensity for three consecutive frames, f−1, f, and f+1, of the input image sequence in digital form, and a computer 4 for processing the currently stored frame f of the image sequence. After each cycle, the most recently processed frame f is fed back to the memory as frame f+1 for the next cycle, frame f−1 is designated frame f, and a new frame f−1 is read into the memory via the analogue to digital converter. The most recently processed frame f may be supplied in digital form to a digital memory device which retains all of the processed frames for use later or may be passed through a digital to analogue converter to an analogue storage device, e.g. a further VCR, or directly to a display.

The frames f−1, f, and f+1 are stored in the memory as 2-D arrays of intensity values, the address of the intensity values in memory corresponding to the location of the corresponding pixel in the image frame.

It will be appreciated that the input sequence could convey information additional to intensity values, for example colour information, but, in the interest of clarity, such considerations will be omitted in the following and the discussion limited to black and white signals.

The digital filter is represented in the form of its funtional structure in FIG. 4; the main steps implemented by this digital filter can be set out as follows:

1. Estimate motion from frame to frame.
2. Decide on the amount of noise in the image, i.e. guess.
3. Fragment the image into blocks.
4. For each block extract a motion compensated volume of 3 blocks from the 3 frames.
5. Use the frequency domain Wiener filter to suppress noise (the guess) in the middle block.

Considering firstly step 1, motion estimation may be carried out using any one the known methods, see for example the methods disclosed in the article by J. Biemond et al, entitled 'A Pel-Recursive Wiener based displacement estimation algorithm' in Signal Processing, 13:pages 399–412, 1987. However, a preferred embodiment of the present invention makes use of the method disclosed in United Kingdom patent application No. 9316153.7. For completeness, a description of this method is repeated hereinafter.

The motion estimation algorithm assign to each pixel or cluster of pixels (having coordinates x,y) in the current frame two displacement vectors $d_{f-1}(x,y,f)$ and $d_{f-1}(x,y,f)$ which define respectively the displacement of that pixel or cluster between the current and preceding frame and between the current and the succeeding frame respectively.

Figure 2:
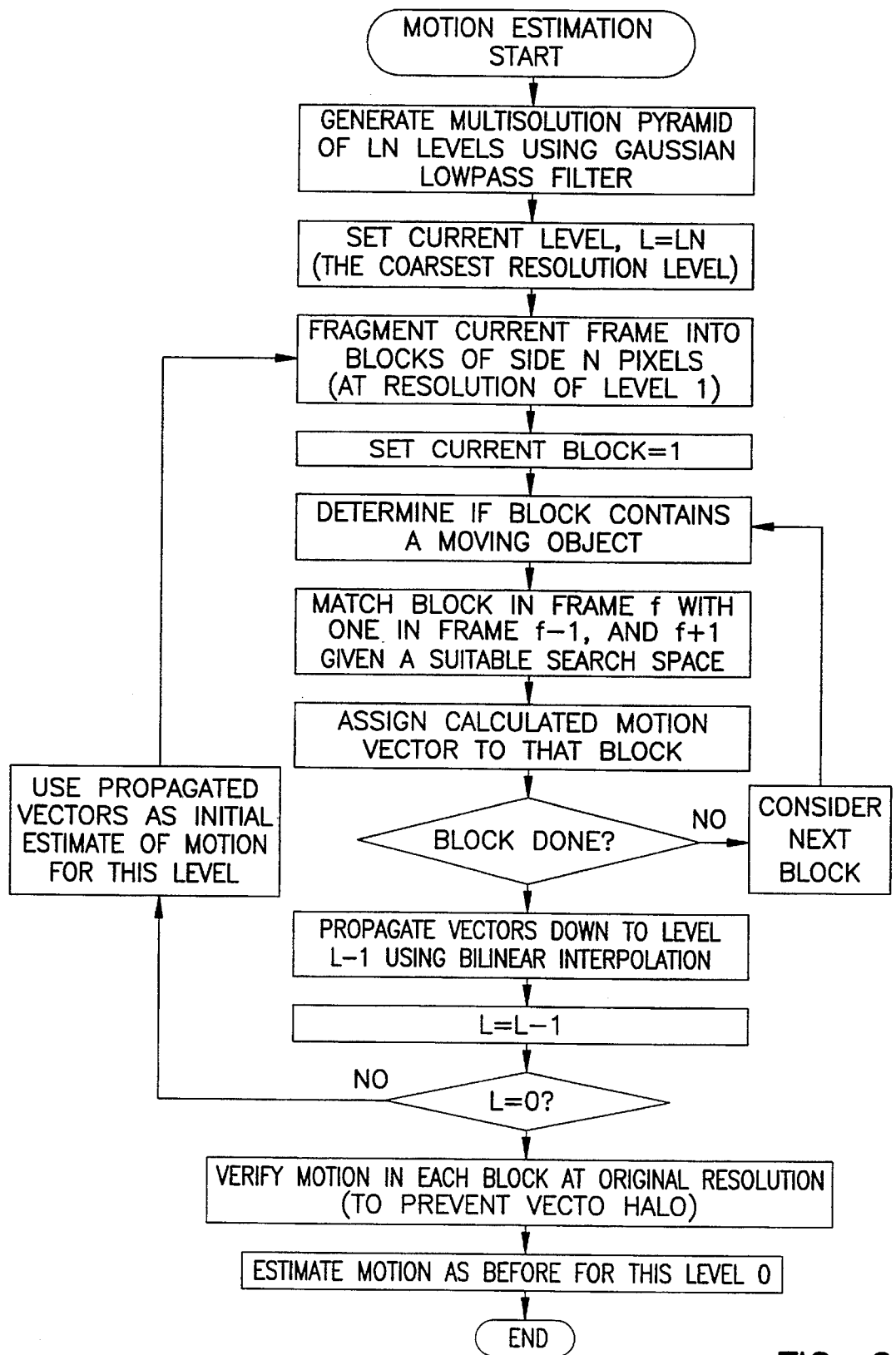
FIG. 2 is a flow diagram for a motion estimation process.

In order to reduce the computational complexity of this process, a multiresolution technique is used which involves generating a number of sublevels L1, L2, L3 . . . Ln (and where L0 represents the level of the original frame) of gradually reduced resolution for each of the three frames. FIG. 2 is a flow diagram showing the steps involved. A first estimate of displacement is obtained from a coarse, or low resolution, level Ln. A second improved estimate is obtained from a higher resolution level Ln−1 using the first estimate to reduce the area which must be searched to match areas of the current frame f with corresponding areas of the surrounding frames f−1 and f+1. The estimate is further improved by considering still higher resolution levels until finally a satisfactory estimate is obtained. In the embodiments now to be described n=3.

Level L1 is generated by operating on the original frame with a low pass filter, i.e. in effect passing a low pass filter mask of given window size over the original frame (which corresponds to level L0). The mask is placed over a portion of the frame to be processed and a value is then generated which is a function of the value of pixels in the area extracted by the mask window. The generated value corresponds to the pixel located in the centre of the mask window and is stored in a new array.

A suitable filtering function is a Gaussian function having the following form:

$$f(p,q) = w(p,q)\frac{1}{A} \exp^{-(\frac{r^2}{2\sigma^2})} \quad (3)$$

so that the intensity value generated is $$I_1(0,0) = \sum_{p=-R}^{R} \sum_{q=-R}^{R} f(p,q) I(p,q) \quad (4)$$

-continued where $$r = \sqrt{(p^2 + q^2)},$$

$$w(p,q) = \begin{bmatrix} 1 & \text{for } p^2 + q^2 \leq R^2 \\ 0 & \text{otherwise} \end{bmatrix}$$

$$A = \sum_{|p|=0}^{R} \sum_{|q|=0}^{R} w(p,q) \exp^{-(\frac{r^2}{2\sigma^2})}$$

and p and q are the local coordinates of pixels within the mask window and the pixel at the centre of the window defines the origin (0,0) of the local coordinate system. For a filter window of 9×9 pixels, R=4 and p and q are in the range −4 to +4. σ is a constant defining the Gaussian function. The mask is moved pixel by pixel across the entire frame until the new array is completely filled. Level L0 is extended at its edges by a strip of pixels having intensity values equal to zero, i.e. black, so that the filter mask can be applied to the pixels around the edges. The resulting filtered frame is subsampled in both the horizontal and vertical directions by a factor of two, i.e. only every other pixel is used in each row of the processed level L0. The result is a frame at level L1. Thus, if the original frame comprises an array of 256×256 pixels, level L1 would comprise a smaller array of 128×128 pixels providing an image which is slightly blurred in comparison to the image provided by level L0 and which has in effect a lower resolution. The process of filtering and subsampling is then carried out on level L1 to produce a level L2 having 64×64 pixels and finally on level L2 to produce a level L3 having 32×32 pixels.

In order to obtain the displacement vectors $d_{f-1}(x,y,f)$ the levels L3 of frames f−1 and f are first subdivided into a number of corresponding A×A pixel blocks. For example, if A=2 each level L3 contains 256 blocks and for each block the following procedure is followed.

(a) Considering a block B(f) within level L3 of frame f, having its upper left corner located at the pixel (i,j), the intensity values of the pixels within the block can be written as I(i,j,f), I(i,j+1,f), I(i+1,j,f), and I(i+1,j+1,f). The intensity values of the pixels within the sees block B(f−1) of frame f−1 can similarly be written as I(i,j,f−1) etc. The mean absolute error between these two blocks is calculated as follows:

$$MAE_0 = \frac{1}{4} \sum_{s=0}^{1} \sum_{t=0}^{1} |I(i+s,j+t,f) - I(i+s,j+t,f-1)| \quad (5)$$

If the mean absolute error $MAE_0$ between these two blocks is less than some threshold value $MAE_t$ (if the pixel intensity is measured on a scale of 0 to 255 a suitable threshold value is 8) then the block is assumed not to be undergoing motion and the displacement vector of the block is stored as [0,0]. However, if $MAE_0$ exceeds $MAE_t$ then the block B(f) might be in motion so a search of the region surrounding the initial block B(f−1) in frame f−1 is commenced.

Figure 3:
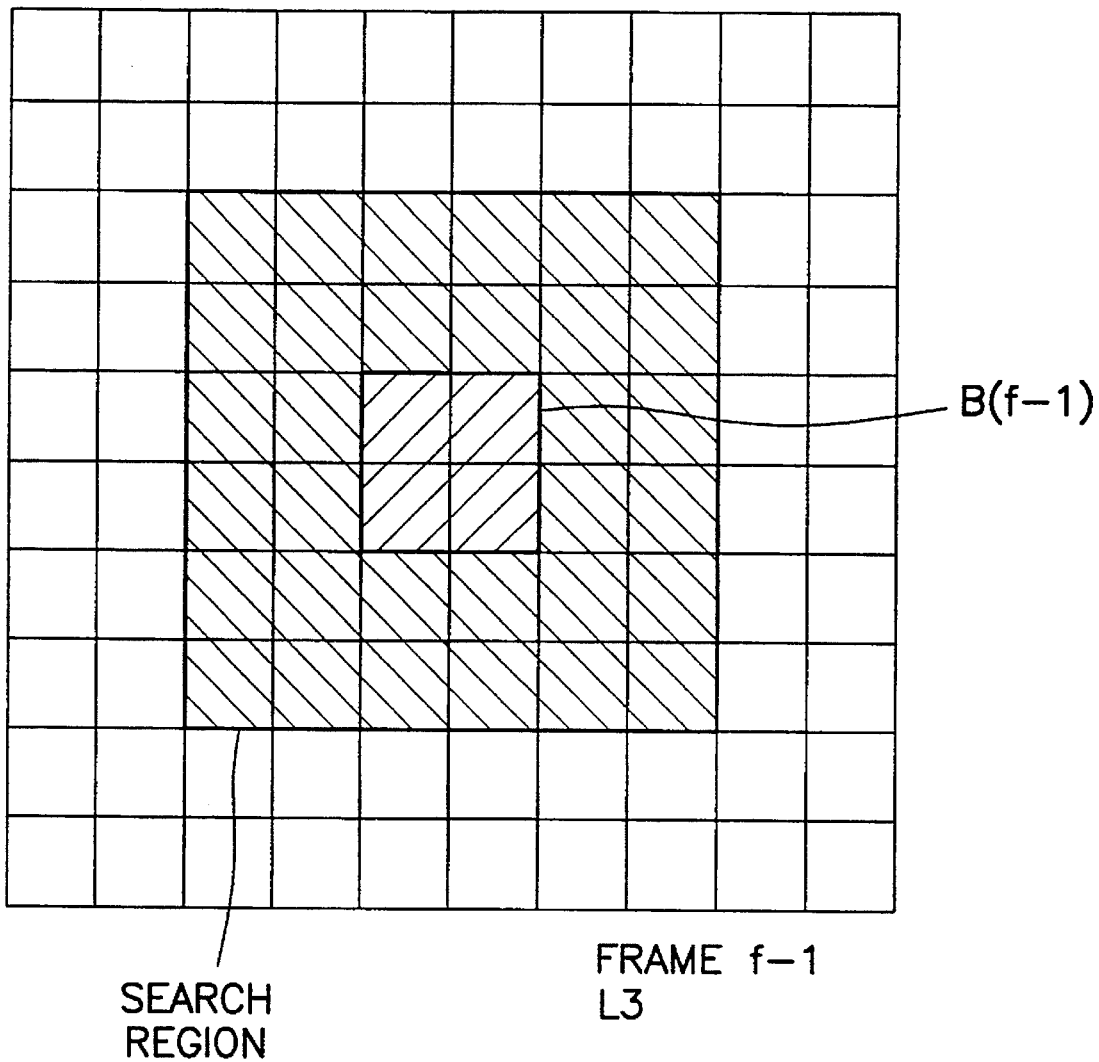
FIG. 3 shows an example of a search region used in the process of FIG. 2.

(b) Considering FIG. 3, which shows a portion of level L3 of frame f−1, the search region is chosen to be a 6×6 block of pixels in frame f−1 centred on the block B(f−1). The mean absolute error $MAE_m$ between the block in the current frame and each of the m=14 possible 2×2 blocks in the search region (this excluding block B(f−1) for which the calculation has already been carried out) is calculated. If the minimum $MAE_m$ obtained (defined as $MAE_{min}$) is not sufficiently less than $MAE_0$, i.e. if $rMAE_{min} > MAE_0$ where r is a real number greater than 1, then, in order to avoid noise giving rise to spurious matches which do not represent true motion in the image sequence, the displacement vector is set to [0,0]. (The threshold factor r may be user definable in order to allow for varying levels of background noise.) However, if $rMAE_{min} \leq MAE_0$, then the offset from the block B(f−1) of the block giving rise to $MAE_{min}$ is stored as the displacement vector to the block B(f). It is noted that the displacement vector for e given block within level L3 can be defined as the displacement vector $d_{f-1}L3(p,q,f)$ for each of the pixels within the block as those pixels are assumed to be subject to the same displacement.

(c) Once a displacement vector has been stored to all the A×A blocks in level L3 of frame f, whether [0,0] or not, the displacement vectors are propagated to the 64×64 pixels of level L2 as follows:

$$d_{f-1}L2(2x,2y,f) = 2d_{f-1}L3(x,y,f) \quad (6)$$

The displacement vectors for those pixels in level L2 which are not assigned a displacement vector by this operation, i.e. every second pixel, are obtained from a bilinear interpolation of, or averaging of, the displacement vectors of the directly adjacent pixels.

(d) For level L2, the motion estimation process of steps (a) and (b) is repeated except that the initial search region in frame f−1 is offset by the corresponding displacement vector propagated down from level L4. The displacement vectors obtained from level L2 are propagated down to level L1 by repeating step (c).

(e) Steps (a) to (d) are in turn repeated to generate displacement vectors for level L0, where $d_{f-1}L0(x,y,f) = d_{f-1}(x,y,f)$. On completion of this operation all 256×256 pixels (in A×A blocks) of level L0 have been assigned a displacement vector.

Before the final bilinear interpolation step is carried out for level L0 however, the displacement vector field propagated from level L1 is checked for so-called motion haloes. This is achieved by repeating the process of step (a) for all the blocks of level L0 without taking into account the propagated displacement vectors. If $MAE_0$ with no motion compensation is less than $MAE_0$ with motion compensation then the pixels of the block are assigned a displacement vector of [0,0] and the propagated displacement vector is ignored. This prevents stationary background regions from being assigned erroneous displacement vectors.

A similar process is carried out on the current and succeeding frames f and f+1 in order to obtain the forward displacement vectors $d_{f+1}(x,y,f)$.

Before considering steps 2 to 5 of the above method, the Wiener filtering process will be generally discussed.

Wiener filtering is a well known technique for the reduction of noise in degraded signals. It has previously been used to good effect for reducing the noise in archived gramophone recordings. The filter can be applied both in the frequency domain, effectively as an IIR (infinite impulse response) filter, or in the spatio-temporal domain as an FIR (finite impulse response) filter.

Provided good motion estimates can be obtained, we have now realised that a 3D implementation of a filter may provide substantial improvement over a 2D implementation. Therefore, the embodiment shortly to be described uses a digital 3D filtering operation on data from three motion compensated frames in a sequence. The data in a block of N×N pixels in each frame is extracted, compensated for motion as described above, to give a data volume of 3 blocks, one each from frame n−1, n, and n+1, and the block is filtered to suppress noise in the central frame.

The observed (noisy) image sequence is defined by the equation (1) above, i.e.:

$$g(i,j,n) = I(i,j,n) + \eta(i,j,n)$$

where g(i,j,n) is the observed (i.e. noisy) signal grey scale value at position (i,j) in the nth frame, I(i,j,n) is the actual (i.e. clean) signal and η(i,j,n) the added Gaussian noise of variance $\sigma_{\eta\eta}$. The filter is derived by first of all deciding on a filter structure, either FIR or IIR, and then finding the coefficients which minimize the expected value of the squared error between the filter output and the original, clean, signal.

The Wiener filter has been used as an effective method for noise and blur reduction in degraded signals. The form of the filter for image sequences proposed herein is an extension of the 1-D result; however the limited amount of temporal information available implies different considerations in the implementation of the method. This following passage makes explicit the various forms of the filter that can be used. The theory presented here ignores motion between frames as motion has been considered above. The present discussion is also limited to the problem of noise reduction in image sequences, blur is not considered.

The Wiener filter attempts to produce the best estimate for I(i,j,n), denoted Î(i,j,n). It does so by minimizing the expected squared error which is given by equation (7) below. This estimate may be achieved using either an IIR or FIR Wiener filter, which operates on the observed noisy signal. Equations (8) and (9) below show respectively IIR and FIR estimators. In equation (8) there are no limits on the summations, hence IIR, and in equation (9) the filter mask (or support) is a symmetric volume around the filtered location of SIZE$(2n_1+1)\times(2n_2+1)\times(2n_3+1)$.

Proceeding with the IIR filter leads here to a frequency domain expression for the Wiener filter. Using the principle of orthogonality to bypass some lines of differential algebra, $E[(e(\ldots))^2]$ is minimized if the error is made orthogonal to the data samples used in the estimate equation (8) and equation (1) below results.

Substituting for e(i,j,n) in equation (10) results in equation (11) below. The filter coefficients are then chosen to satisfy the condition of equation (11). Substituting for Î(i,j,n) in (11) gives equation (12) below.

The expectations can be recognized as terms from the autocorrelation and crosscorrelation sequences of the observed image sequence g(i,j,n) and the actual sequence I(i,j,n). The solution involves a separate equation for each coefficient, i.e. an infinite set of equations. However, using the 3D DFT gives a tractable result in terms of the power spectra concerned. From equation (11) equation (13) results assuming stationary statistics. Taking the Fourier transform of equation (13) yields equation (14) below. The only unknown quantity in equation (14) is the cross power spectrum $P_{ig}$. However, using the original assumption of uncorrelated noise and image frames implies the relationships given in equations (15) and (16). From these two relationships, an expression for the 3D frequency domain Wiener filter, $A(\omega_1,\omega_2,\omega_3)$, is as given in equation (17).

The estimated signal, Î(i,j,n) is then given by the equation (18) below.

The IDFT is the inverse 3D DFT, and $G(\omega_1, \omega_2, \omega_3)$ is the 3D DFT of the observed signal, g(i,j,n). The filter is therefore defined by the signal power spectrum and the noise variance.

Using the 3D DFT in this way makes the Wiener filter computationally attractive. However in the temporal direction there are often not many frames involved. Therefore, the temporal Fourier component is less meaningful, having been derived from only a few samples. In the method described herein, 3 frames are involved, hence the DFT in the temporal direction involves just 3 samples. The assumption of an infinite support volume is violated. This phenomenon is also applicable to the spatial components since the image is only stationary over small areas. Therefore, in a practical situation, the 3D IIR filter, implemented in the frequency domain in this way, is no longer IIR since it operates on a finite volume of input data only and not on any past outputs.

The FIR filter gives an estimate of the clean pixel by using only a restricted local set of pixels just around the pixel to be estimated (like the 3D AR model support of UK Patent Application No. 9316153.7). The IIR filter uses all pixels in the data volume to give an estimate of the clean signal. It is found that the FIR filter is generally less successful than the IIR filter and so the preferred embodiment using the IIR will now be discussed.

The IIR form of the filter yields a frequency domain expression which requires an estimate of the Power Spectrum of the original, clean, data to yield the attenuation factor required for each frequency bin. The 3D Wiener filter in the frequency domain is as given by equation (17) below, where $A(\omega_1,\omega_2,\omega_3)$ defines the frequency response of the filter, and $P_{gg}, P_{\eta\eta}$ refer to the Power spectral densities of the degraded and noise signals respectively. The arguments to the functions refer to discrete frequency bins as gained via the 3D FFT (the n-dimensional FFT is a separable operation and is implemented as a recursive FFT operation in orthogonal directions).

Bearing in mind that the noise is assumed to be uncorrelated, and equation (15) below applies, it follows that the effect of the Wiener filter is to attenuate the frequency components of g(i,j,k) according to the observed power of that particular component. When this is high, $P_{gg} >> P_{\eta\eta}$, less filtering is done, and when this power is low, the component is heavily attenuated. This is a useful property for images in particular. In regions of high image activity, such as highly textured areas and edges, there is less attenuation of the signal. In areas of low activity such as uniform areas, more attenuation is achieved. The signal detail is therefore less attenuated than in the uniform regions. The human visual system is known to be less sensitive to noise in regions of high activity. This is a useful bonus since the areas in which the filter will attenuate less noise corresponds to the areas in which noise is less easily observed.

The situation is exactly the same along the temporal axis. The activity along the temporal axis depends on the accuracy of motion estimation. When the motion estimation is not accurate, the filter will automatically reduce the contribution of the temporal information to the noise reduction. This property makes the filter robust to even large errors in motion estimation. Of course the amount by which it reduces the attenuation when this problem occurs may not correspond to an optimal result visually. Never the less, the filter has an advantage in this respect in comparison with motion compensated frame averaging which tends to blur the image when the motion is not correctly estimated.

The derivation of the 3D Frequency domain Wiener filter can be obtained as an extension of the standard 1D framework. However, in a practical implementation, there are the following outstanding considerations.

1. Estimating the PSD

As indicated by equation (7), the Wiener filter can be defined in terms of the PSD of the observed degraded signal and the noise PSD. The embodiment presented here does not automatically estimate the noise PSD, rather it is a user selectable parameter which is altered to suit the tastes of the viewer. This is due to the fact that the noise PSD is assumed to be a constant level across all the frequency components. The PSD of the degraded signal is estimated by the magnitude of the 3D FFT. To prevent leakage effects, the signal is windowed prior to the FFT operation. Many window functions exist for this purpose. The half-cosine window is chosen here, following the method taught by R. Young and N. Kingsbury in their article entitled 'Video Compression using Lapped Transforms for Motion Estimation/Compensation and Coding, SPIE VCIP, pages 276–288, 1992. For a block size of N×N the window is defined by equation (19) below. This window is called the analysis window since it is used to assist in acquiring an estimate of the Fourier Transform of the image data.

The image information in each frame is therefore windowed with this 2D half-cosine window prior to taking the FFT. There is an argument for implementing a similar analysis window along the temporal axis since again there would be problems in taking the FFT in this direction. In practice the visible effect of using a half-cosine window across the 3 frames (a 3 tap half-cosine window) is found to be small.

2. Overlapping processing

The entire image cannot be treated with the same Wiener filter since the image information changes across the frame. Therefore, the image is broken into blocks of size N×N. Each block is compensated for motion across the three frames used so that in restoring the information in a block in the current frame n a data volume of size N×N×3 is used.

It is common in such a block based algorithm that the non-stationarity of the image would cause blocking artifacts across the edges of the blocks. To suppress this effect the processed blocks can be overlapped. In this implementation the blocks are overlapped by half their horizontal and vertical dimensions, an overlap of 2:1. If the processed blocks were merely placed such that one half of the next block replaced one half of the current block then artifacts can still occur. Overlapped processing implies windowing the output data such that when the overlapped blocks are summed, the new gain is 1. Therefore any output pixel at the edge of a block has a contribution from several blocks around it.

The output or synthesis window must be chosen with regard to the analysis window. The two windows complement each other and taken together must not change the net gain through the noise reduction system. In this case, using a half-cosine window (and 2:1 overlap) as synthesis and analysis windows yields a net gain of unity as required. The net windowing effect is that of a raised cosine function as given by equation (20) below.

The frequency domain Wiener filter involves estimating an attenuation for each frequency component in the degraded signal. In the calculation of each factor it is possible that $P_{gg}(\gamma_1, \gamma_2, \gamma_3) < P_{nn}(\gamma_1, \gamma_2, \gamma_3)$ in the numerator of equation (7). This would result in a negative attenuation which is impractical. The most common method for dealing with this problem is to set $P_{gg} - P_{nn} = 0$ when $P_{gg} < P_{nn}$. Note that the frequency arguments have been dropped and the notation simplified.

However, this solution is somewhat drastic and can lead to ringing or patterned noise artifacts in the output frame. To avoid this difficulty, an alternative mapping may be used which reduces the attenuation of the filter for low values of $P_{gg}$. This implies that more noise is left in the image but this is preferable to the artifacts that would otherwise occur. The new mapping is as given by equation (21) below, where the Wiener filter is defined as $\alpha/(P_{gg})$.

When $\beta=1$ the criterion becomes the same as that used previously in the method disclosed in 13, 14. $\beta$ is a user defined parameter that governs the amount of noise left in the restoration and is therefore called the Noise Margin. The mapping is illustrated in FIG. 4. The modified Wiener filter attenuation is given by equation (22) below. Note that since $(\beta-1)/\beta$ is a constant, the effect is to define a minimum, non-zero, value of the filter coefficient at frequency bins where a would normally be set to zero.

To produce a noise reduced version of frame n given frames of resolution of M×M pixels the following digital filter steps are appropriate where, for example, the image is 256×256 pixels and a restoration of frame 5 is required.

1. Set up a restored frame array of M×M pixels which are set to zero. Call this restored version of frame n (here frame 5) the signal r(i,j,k) (recall that this is $\hat{I}(i,j,k)$ above).

2. Begin at the top left hand corner.

3. Select a B×B block of pixels with corners at (0,0), (0,B–1), (B–1,0), (B–1,B–1) in noise frame n, call this block BP. Note that B is much smaller than M because the image material is highly non-stationary and so small blocks should be used. In this example B=8.

4. Select a B×B block of pixels in the previous frame n−1 (here frame 4) which corresponds to the block BP in frame n with respect to motion. It would have corners at $(0+sx_{-1}, 0+sy_{-1})$, $(0+sx_{-1}, B-1+sy_{-1})$, $(B-1+sx_{-1}, 0+sy_{-1})$, $(B-1+sx_{-1}, B-1+sy_{-1})$ where $[sx_{-1}, sy_{-1}]$ is the motion vector $d_{-1}$ mapping the block BP into the previous frame. This motion vector is taken from the vector estimated at the location (B/2,B/2) from the previous motion estimation stage. The block size used here for noise reduction may not be the same as the size used for Block Matching previously. Call this motion compensated block in frame n−1 (4) block BB.

5. Select a block of pixels in frame n+1 in the same way as in the previous step except of course using the motion vector $d_{+1}$ mapping the block in the current frame (BP) into a block in the next frame (frame 6). Call this block BF.

6. Arrange the blocks BB BP BF in that order to form a 3D volume of data. Consider now this data volume to be a new signal of 3 frames of size B×B so that the pixels are indexed from 0 to B−1 horizontally and vertically, and from 0 to 2 temporally.

7. Subtract the mean of the 3D data volume from the data volume, i.e as defined by equation (23) below.

8. Window the frame BP using the half Cosine window. This is just a weighting function applied to the pixels in the frame depending on their position from the centre of the frame. The reason for this is given later. Say the pixel at (i,j) in BP is of value g(i,j), then the value of the windowed pixel $g_w(i,j)$ in the resulting windowed block WBP is as given by equations (24) to (26) below.

9. Do the same as the previous step to produce windowed blocks WBB, WBF.

10. Calculate the 3D DFT of the 3D data volume WBB WBP WBF. If the signal is now given by $g_w(i,j,k)$, where k is the frame index with numbers from 0 to 2 (corresponding to BB BP BF), then the 3D DFT is defined by equation (27) below. The resulting values G(u,v,w) now represent the 3D frequency content of the 3D data $g_w(i,j,k)$. This is a natural multidimensional expansion of the one dimensional DFT. As is seen from the equation, it is represented by a separable implementation of 1-D DFT's along rows, then columns, then frames.

11. Attenuate the frequency components (represented by G(u,v,w)) using the Wiener filter H(u,v,w) such that the result is $\hat{I}_w(u,v,w)$. $\hat{I}_w(u,v,w)$ is actually the frequency transform of the estimate of the clean signal $I(i,j,k)$. The Wiener filter is implemented in the frequency domain using $\hat{I}_w(u,v,w)=H(u,v,w)G(u,v,w)$ such that the operation is in effect to weight the frequency components of the dirty signal $G(u,v,w)$. The actual weighting is defined by equation (28), and the associated definitions, given below. In these definitions, $w(i,j,k)$ are the coefficients of the window function (the Half Cosine window) at each coordinate position in the data volume. (Recall that the same 2D Window function is used in each block and so the value at a particular spatial coordinate in each block is the same if the spatial coordinate is the same.) Note that it is assumed that there is noise of variance $\sigma_{\eta\eta}$ in the image. This noise is also transformed when taking the DFT and hence is not the same value when calculating the Power Spectral Density (PSD, Power Spectrum) of the signal (note that for this purpose the power spectrum is approximated by the squared magnitude of the DFT components). Recall that in the ideal world the Power Spectral Density (PSD) of noise of variance $\sigma_{\eta\eta}$ is a constant value for all the PSD components. However, the signal has been windowed and so this value has to be altered in the PSD space. It works out that the noise value to use in the PSD space is given as the product of the noise variance and the mean of the square of all the window weights in the B×B×3 data volume.

12. Invert the transformed signal $\hat{I}(u,v,w)$ using the inverse DFT. This is done with the equation 29 below; note that again the operation is separable and it is unnecessary to calculate the spatial IDFT portion of the equations for the transformed blocks WBB and WBF because it is only the image data in WBP that is required. The result of this inverse transform is the restored signal, i.e. as given by equation (29) below.

13. The mean value is now be added back to the block. However, because the block was windowed after removing the average in the previous step 8, the average that is now replaced must also be windowed. This is not a simple thing to appreciate, and was discovered by the inventor only by tracking down errors that occurred when the flat mean was added. Note that Just the 2nd block in the volume needs to be treated (i.e. block BP) since this is the block corresponding to the portion of the image that is being restored. The operation is given by equation (30) below, where the window coefficients are defined as before.

14. Now this result is again windowed using the half cosine window. This is done so that the output restorations can be overlapped so that the spatial nonhomogeniety of the image does not show up in the restoration as blocking artifacts. The operation can be done in place and is defined by equation (31) below.

15. Now the resulting windowed block is added to the restored frame in the same location that it came from. The addition operation is done so that, because of the shape of the window function, at the end of the processing for the whole frame areas at the edge of the block contain information from the 4 blocks that overlap it. Therefore, equation (32) below results. Note that the addition in this case Just means adding in the restored block into the r frame at the location in the r frame that the block was taken from in the first place.

16. The treatment for the corner block is now complete. The process is repeated for a block which is shifted by B/2 (here 4 pixels) horizontally, again adding the result into $r(i,j,n)$. The other blocks treated are all shifted along by (B/2) in the same way, doing the same operations, until the first row is done. Then the next row is done using blocks shifted B/2 vertically etc until all the rows are done and so the frame n (5 here) is restored in frame r. This r is the restored version of $g(i,j,5)$ and is now output from the device.

17. The process is now complete.

The previous section, which described some of the theory involved, mentioned the use of windowing both for synthesis and analysis. The reason one uses a window prior to frequency transform estimation is to improve the accuracy of the spectral estimate. If one did not do this then one finds that the value of a particular component 'leaks' into the components around it. That is to say the various spectral components do not then reflect the true frequency content. This is a matter taken up in most basic texts on digital signal processing. Because the window is used to help the frequency estimation accuracy, it is called an analysis window: it is used for helping the analysis of the signal in terms of frequency content.

Windowing after processing has a different purpose. First of all, consider what happens if the blocks used do not overlap at all. The block at the upper left hand corner would then have nothing to do with the block next to it or below it or across from it. So say the image had a lot of rapidly varying texture here, then the blocks would not give a continuous restoration but rather a 'blocky' artifact would result. This is simply because the data in each block turned out to be different so the restorations of each block are separate and so at the block boundaries a discontinuity of some kind would result. If the blocks were overlapped, then some of the data inside each one would be also contained in another block or blocks and so the resulting restoration could be made more smooth.

But how does one combine the output of overlapping blocks? There are two ways. One way is to use some block overlap but, when putting back the restoration, put back just the centre of the block. Say there are 2 blocks of 3×3 pixels next to each other with a 2 pixel overlap. Then block 1 is at say (0,0), (2,0), (2,2), (0,2) and the block 2 is at (1,0), (3,0), (4,3), (1,3). Both blocks are extracted from the image and then processed to give two restored blocks R1 and R2. One could then Just replace the pixel at (1,1) in the restored image with the value of the pixel at (1,1) in block 1; and replace pixel at (2,1) in the restored image with the value at (1,1) in R2. (Recall that once the blocks are extracted their spatial data would be indexed by (0 . . . 2,0 . . . 2)). This would look alright provided the overlap were large, the reason being that, even though the replaced data do not overlap, the data from which they were derived did contain an overlapping region. But often one finds that unless excessively large overlaps are used Blocking still persists, so the alternative is to window the blocks and then add them together with this partial overlap such that, when the windowed blocks add, the overall gain (even for the edge data) is 1.

The final data, therefore, after this sum/overlap process at the edge of blocks is created by summing windowed data from one block with windowed data from another block. The window used is called the synthesis window because it is used to sum the blocks in the restoration, i.e. synthesize the restoration. Whilst there are more direct ways of solving problems with non-homogeneous signals the above described method is a practical solution which works well.

The reasons half cosine window is used is because it works well. Also, the analysis and synthesis windows are then the same so conserving on memory, Subtracting the mean is carried out because the Wiener filter used is defined for zero mean signals only. If one adds a random noise to an image patch, the mean value (or average brightness) cannot be affected because taking the mean of the picture elements has the effect of averaging out the noise added.

The DFT (Discrete Fourier Transform) is standard DSP theory and is the discrete equivalent to the Fourier Transform. There exists an extremely fast way of implementing it called the Fast Fourier Transform (FFT) algorithm.

$$\hat{I}_n(i,j) = \frac{1}{n}\,[(n-1)\hat{I}_{n-1}(i,j) + g_n(i,j)] \tag{2}$$

$$E[(e(i,j,n))^2] = E[(I(i,j,n) - \hat{I}(i,j,n))^2] \tag{7}$$

$$\hat{I}(i,j,n) = \sum_{k_1}\sum_{k_2}\sum_{k_3} a(k_1,k_2,k_3) g(i+k_1, j+k_2, n+k_3) \tag{8}$$

$$\hat{I}(i,j,n) = \sum_{k_1=-N_1}^{N_1}\sum_{k_2=-N_2}^{N_2}\sum_{k_3=-N_3}^{N_3} a(k_1,k_2,k_3) g(i+k_1, j+k_2, n+k_3) \tag{9}$$

$$E[e(i,j,n) g(i+k_1 j + k_2, n+k_3)] = 0 \;\forall\; k_1,k_2,k_3 \tag{10}$$

$$E[\hat{I}(i,j,n) g(i+k_1 j + k_2, n+k_3)] = E[I(i,j,n) g(i+k_1 j + k_2, n+k_3)] \;\forall\; k_1,k_2,k_3 \tag{11}$$

$$\sum_{l_1,l_2,l_3} a(l_1,l_2,l_3) E[g(i+l_1 j + l_2, n+l_3) g(i+k_1 j + k_2, n+k_3)] = E[I(i,j,n) g(i+k_1 j + k_2, n+k_3)] \;\forall\; k_1,k_2,k_3,l_1,l_2,l_3 \tag{12}$$

$$\sum_{l_1}\sum_{l_2}\sum_{l_3} a(l_1,l_2,l_3) R_{gg}(l_1-k_1, l_2-k_2, l_3-k_3) = R_{ig}(k_1,k_2,k_3) \tag{13}$$

$$A(\omega_1,\omega_2,\omega_3) P_{gg}(\omega_1,\omega_2,\omega_3) = P_{ig}(\omega_1,\omega_2,\omega_3) \tag{14}$$

$$P_{gg} = P_{ii} + P_{\eta\eta} \tag{15}$$

$$P_{ig} = P_{ii} \tag{16}$$

$$A(\omega_1,\omega_2,\omega_3) = \frac{P_{gg}(\omega_1,\omega_2,\omega_3) - P_{\eta\eta}(\omega_1,\omega_2,\omega_3)}{P_{gg}(\omega_1,\omega_2,\omega_3)} \tag{17}$$

$$\hat{I}(i,j,n) = IDFT[A(\omega_1,\omega_2,\omega_3) G(\omega_1,\omega_2,\omega_3)] \tag{18}$$

$$w(n_1,n_2) = \cos\left(\frac{n_1\pi}{2N}\right) \cos\left(\frac{n_2\pi}{2N}\right) \tag{19}$$

$$\text{for } n_1, n_2 = -\left(N-\frac{1}{2}\right), -\left(N-\frac{1}{2}\right)+1, \ldots, \left(N-\frac{1}{2}\right)$$

$$w(n_1,n_2) = \cos^2\left(\frac{n_1\pi}{2N}\right) \cos^2\left(\frac{n_2\pi}{2N}\right) \tag{20}$$

$$\text{for } n_1, n_2 = -\left(N-\frac{1}{2}\right), -\left(N-\frac{1}{2}\right)+1, \ldots, \left(N-\frac{1}{2}\right)$$

$$\alpha = \begin{cases} P_{gg} - P_{\eta\eta} & \text{for } P_{gg} > \beta P_{\eta\eta} \\ \dfrac{\beta-1}{\beta} P_{gg} & \text{otherwise} \end{cases} \tag{21}$$

$$H(\omega_1,\omega_2,\omega_3) = \text{MAX}\left\{ \left(\frac{\beta-1}{\beta}\right), \frac{P_{gg}(\omega_1,\omega_2,\omega_3) - P_{\eta\eta}(\omega_1,\omega_2,\omega_3)}{P_{gg}(\omega_1,\omega_2,\omega_3)} \right\} \tag{22}$$

$$[BB\;BP\;BF] = [BB\;BP\;BF] - \overline{[BB\;BP\;BF]} \tag{23}$$

$$g_w(i,j) = g(i,j) \cos\left(\frac{n_1\pi}{2B}\right) \cos\left(\frac{n_2\pi}{2B}\right) \tag{24}$$

$$\text{where } n_1 = -\left(B-\frac{1}{2}\right) + i \tag{25}$$

$$\text{where } n_2 = -\left(B-\frac{1}{2}\right) + j \tag{26}$$

$$G(u,v,w) = \sum_{k=0}^{B} \sum_{j=0}^{B} \sum_{i=0}^{B-1} g_w(i,j,k) e^{-\frac{2\pi i u}{B}} e^{-\frac{2\pi j v}{B}} e^{-\frac{2\pi k w}{B}} \tag{27}$$

$$\hat{I}(u,v,w) = H(u,v,w) G(u,v,w) \tag{28}$$

$$H(u,v,w) = \text{MAX}\left\{ \left(\frac{\beta-1}{\beta}\right), \frac{P_{gg}(u,v,w) - P_{\eta\eta}(u,v,w)}{P_{gg}(u,v,w)} \right\}$$

where $P_{gg}(u,v,w) = |G_w(u,v,w)|^2$ and $P_{\eta\eta}(u,v,w) = |\sigma'_{\eta\eta}|^2$ and $\sigma'_{\eta\eta} = \sigma_{\eta\eta} w\,(i,j,k)^2$ $$\hat{I}(i,j,k) = \frac{1}{B^3} \sum_{w=0}^{B-1} \sum_{u=0}^{B-1} \sum_{v=0}^{B-1} \hat{G}(u,v,w) e^{\frac{2\pi i u}{B}} e^{\frac{2\pi j v}{B}} e^{\frac{2\pi k w}{B}} \quad (29)$$

$$BP(i,j) = BP(i,j) + \text{MEAN} \cos\left(\frac{n_1 \pi}{2B}\right) \cos\left(\frac{n_2 \pi}{2B}\right) \quad (30)$$

$$\hat{I}(i,j,n) = \hat{I}(i,j,n) \cos\left(\frac{n_1 \pi}{2B}\right) \cos\left(\frac{n_2 \pi}{2B}\right) \quad (31)$$

where $n_1 = -\left(B - \frac{1}{2}\right) + i$ where $n_2 = -\left(B - \frac{1}{2}\right) + j$ $$r(i,j,k) = r(i,j,k) + BP \quad (32)$$

I claim:

1. A method of digitally filtering noise from a current frame f of an image sequence having a plurality of frames, the method comprising:

selecting a data set corresponding to the values of a plurality of pixels in the said current frame f and the values of a corresponding plurality of pixels in at least one of a frame f+1 succeeding the said current frame and a frame f−1 preceding the said current frame in the said image sequence;

applying a 3-dimensional Wiener filtering operation, involving 3D correlations, to said data set to replace pixels of the said current frame f by pixels having values, obtained from the filtering operation, which are a function of the said data set.

2. A method as claimed in claim 1 and comprising the steps of:

applying a motion compensation process to said at least one of the said succeeding and preceding frames to derive vector data mapping the pixels in the said current frame into said at least one of the succeeding and preceding frames; and using said vector data to define a 3-dimensional space to which the said Wiener filtering operation is applied.

3. A method as claimed in claim 2, wherein the filter operation applying step comprises applying the filter in the spatio-temporal domain as a FIR filter.

4. A method as claimed in claim 2, wherein the filter operation applying step comprises applying the filter in the frequency domain as an approximation to a IIR filter.

5. A method of removing noise from a current frame f of an image sequence having a plurality of frames, the method comprising the steps of:

(a) applying a motion compensation process to at least one of a frame preceding and a frame succeeding the current frame in said image sequence;

(b) selecting a zone in said current frame;

(c) selecting, using motion compensation data from step (a), substantially the same zone in both of the said preceding and succeeding flames to define with said zone of the current frame a three-dimensional data set of pixels; and (d) applying a 3-dimensional Wiener filtering operation, utilizing 3D correlations of the said data set, to replace pixels of the said current frame f by filtered pixel values obtained from the filtering operation.

6. A method as claimed in claim 5, wherein the applying step comprises applying said filter in the frequency domain as an approximation to a IIR filter.

7. A method as claimed in claim 6, wherein the applying step comprises applying a 3D discrete Fourier transform (DFT) to the data set to define a plurality of discrete frequency components (bins) by which the frequency response of the filter is defined.

8. A method as claimed in claim 7, and comprising the step of attenuating the components using the Wiener filter and the step of applying the inverse DFT to obtain filtered pixel values for the current frame.

9. A method as claimed in claim 5 wherein step (a) comprises: estimating the image displacement between two frames by calculating the mean absolute error $MAE_0$ between a block in a first of the frames and a block in the corresponding location in the second of the frames, calculating the mean absolute error $MAE_m$ between the first block in the first frame and a plurality of blocks of a search region of m blocks in the second frame and which region contains the second block and each of the m blocks being offset from the second block in the second frame; identifying which of said plurality of searched blocks of the search region in the second frame gives rise to the minimum $MAE_m$ ($MAE_{min}$) and assigning to the first block, in the first frame, a displacement vector corresponding to said offset of the identified block.

10. A method according to claim 9 wherein said displacement vector corresponding to said offset is only assigned to the first block when $r*MAE_{min} \leq MAE_0$, where r is a constant greater than 1.

11. A method according to claim 10 comprising generating for each frame L0 at least one sublevel Ln of reduced resolution, dividing the level of lowest resolution into a plurality of said blocks, obtaining displacement vectors for each block, and assigning to the next level Ln−1 the displacement vectors obtained.

12. A method according to claim 11 wherein a level Ln is generated by passing a low pass filter mask over the preceding level Ln−1 and subsampling the resulting filtered frame in the horizontal and vertical directions.

13. A method of removing noise from a current frame f of an image sequence having a plurality of frames, the method comprising the steps of:

(a) applying a motion compensation process to at least one of a frame preceding and a frame succeeding the current frame in said image sequence;

(b) selecting a zone in said current frame;

(c) selecting, using motion compensation data from step (a), substantially the same zone of the at least one of the said preceding and succeeding frames, thus to define with said zone of the current frame a three-dimensional data set of pixels;

(d) converting the data set to the frequency domain by applying a 3D fast Fourier transform (FFT) process to the said data set to produce a plurality of frequency components (bins) thereof;

(e) applying a Wiener filtering operation to attenuate the said frequency components (bins);

(f) applying the inverse of the said 3D FFT process to produce restored pixels of the said current frame f.

14. A method as claimed in claim 13, wherein the Weiner filter attenuates the frequency components in inverse relation to the power of the components.

15. A method as claimed in claim 14, wherein the current frame is processed as a plurality of zones, each of which is processed by steps c) to f).

16. A method as claimed in claim 15, wherein the zones are blocks which overlap and which are windowed such that filtered pixels near the edges of the blocks have a contribution from a plurality of surrounding blocks.

17. A method as claimed in claim 16 wherein the step e) comprises determining an attenuation for the pixels of the zone at each of a plurality of distinct frequencies, the attenuation determination comprising:

defining a power spectral density (PSD) for said noise ($P_{\eta\eta}$) at each of a plurality of distinct frequencies;

determining the PSD of the zone being processed ($P_{gg}$) at said frequencies; and determining a frequency response A of the filter as a function of the difference ($P_{gg}-P_{\eta\eta}$) between the PSD of the zone and that for said noise.

18. A method as claimed in claim 17, wherein negative attenuations are avoided by taking said difference at any one of said frequencies as a non-negative value when said difference is negative.

19. A method as claimed in claim 18, wherein determining the frequency response comprises:

defining a noise margin factor $\beta$;

adopting the difference $P_{gg}-P_{\eta\eta}$ when $P_{gg}>\beta P_{\eta\eta}$;

otherwise replacing the difference by a value which is a positive value and a direct function of $P_{gg}$.

20. A method as claimed in claim 19, wherein, between steps c) and d), a mean of the data set is determined and then subtracted from the data set and, after step f), the said mean is added back into the data set.

21. A method as claimed in claim 20, and comprising the step, after subtraction of the mean and before step d), of subjecting the blocks of the data set to an analysis windowing step, and the step, after filtering, of applying said analysis windowing to the mean before the mean is added back.

22. A method as claimed in claim 21 and comprising the step of applying a synthesis window to the pixels after the mean is added back in order to compensate for the contributions to pixels from the filtering of overlapping zones.

23. A method of removing noise from a current frame f of an image sequence having a plurality of frames, the method comprising:

Fourier transforming the values of a plurality of pixels in the current frame f to obtain a data set;

applying a Wiener filtering operation to said data set to attenuate frequency components within the data set as a function of the difference between the spectral power density of $P_{\eta\eta}$ of a noise signal associated with each frequency component and the spectral power density $P_{gg}$ of the data set when $P_{gg}$ is greater than $\beta P_{\eta\eta}$, where $\beta$ is a constant greater than 1; and when $P_{gg}$ is less than $\beta P_{\eta\eta}$ attenuating said frequency components by a non-negative factor which reduces as $P_{gg}$ reduces.

24. A method as claimed in claim 23, wherein the said factor is a direct function of $P_{gg}$.

25. A digital filter for removing noise from a current frame f of an image sequence having a plurality of frames, the filter comprising:

(a) means for applying a motion compensation process to at least one of a frame preceding and a frame succeeding the current frame in said image sequence;

(b) means for selecting a zone in said current frame;

(c) means for selecting, using motion compensation data from said applying means, substantially the same zone of the at least one of the said preceding and succeeding frames to define with said zone of the current frame a three-dimensional data set of pixels;

(d) means for converting the data set to the frequency domain by applying a 3D fast Fourier transform (FFT) process to the said data set to produce a plurality of frequency components (bins) thereof;

(e) means for applying a Wiener filtering operation to attenuate the said frequency components (bins); and (f) means for applying the inverse of the said 3D FFT process to produce restored pixels of the said current frame f.

26. A filter as claimed in claim 25, and comprising means for processing the current frame as a plurality of zones each of which is processed by the means c) to f), wherein the zones are blocks which overlap and which are windowed such that filtered pixels near the edges of the blocks have a contribution from a plurality of surrounding blocks.

27. A filter as claimed in claim 26 wherein the means for applying Wiener filtering comprises means for determining an attenuation for the pixels of the zone at each of a plurality of distinct frequencies, the attenuation determination means comprising:

means for defining a power spectral density (PSD) for said noise ($P_{\eta\eta}$) at each of a plurality of distinct frequencies;

means for determining the PSD of the zone being processed ($P_{gg}$) at said frequencies; and means for determining a frequency response A of the filter as a function of the difference ($P_{gg}-P_{\eta\eta}$) between the PSD of the zone and that for said noise;

the means for determining frequency response comprising:

means for defining a noise margin factor $\beta$; and means for adopting the difference $P_{gg}-P_{\eta\eta}$ when $P_{gg}>\beta P_{\eta\eta}$ and for otherwise replacing the difference by a value which is a positive value and a direct function of $P_{gg}$.

* * * * *